US008730612B1

(12) United States Patent
Haralson

(10) Patent No.: US 8,730,612 B1
(45) Date of Patent: May 20, 2014

(54) DISK DRIVE EVALUATING RATIO OF FLY HEIGHT SETTING FOR FIRST AND SECOND HEADS TO VERIFY OPERABILITY

(75) Inventor: Phillip S. Haralson, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 85 days.

(21) Appl. No.: 13/328,267

(22) Filed: Dec. 16, 2011

(51) Int. Cl.
*G11B 5/60* (2006.01)
(52) U.S. Cl.
USPC ............................................. 360/75; 360/234
(58) Field of Classification Search
USPC ................. 360/55, 63, 75, 230, 234
See application file for complete search history.

(56) References Cited

U.S. PATENT DOCUMENTS

| | | | |
|---|---|---|---|
| 4,841,389 A * | 6/1989 | Hoyt et al. ..................... 360/75 |
| 5,377,058 A | 12/1994 | Good et al. | |
| 5,677,812 A | 10/1997 | Cha | |
| 6,147,488 A | 11/2000 | Bamba et al. | |
| 6,266,199 B1 | 7/2001 | Gillis et al. | |
| 6,307,817 B1 | 10/2001 | Tsuboi | |
| 6,411,458 B1 * | 6/2002 | Billings et al. ..................... 360/75 |
| 6,501,606 B2 | 12/2002 | Boutaghou et al. | |
| 6,570,378 B2 | 5/2003 | Goh et al. | |
| 6,603,617 B1 | 8/2003 | Cross | |
| 6,608,727 B2 | 8/2003 | Ottesen et al. | |
| 6,630,824 B2 | 10/2003 | Richter | |
| 6,674,590 B2 | 1/2004 | Ottesen et al. | |
| 6,697,203 B1 | 2/2004 | Cheng et al. | |
| 6,714,368 B1 | 3/2004 | Himle et al. | |
| 6,898,033 B2 | 5/2005 | Weinstein et al. | |
| 6,987,630 B1 | 1/2006 | Higgins et al. | |
| 7,038,875 B2 | 5/2006 | Lou et al. | |
| 7,068,449 B2 | 6/2006 | Riddering et al. | |
| 7,068,451 B1 | 6/2006 | Wang et al. | |
| 7,196,860 B2 | 3/2007 | Alex | |
| 7,209,304 B2 | 4/2007 | Seng et al. | |
| 7,265,933 B1 | 9/2007 | Phan et al. | |
| 7,324,299 B1 | 1/2008 | Schreck et al. | |
| 7,330,324 B2 | 2/2008 | Morinaga et al. | |
| 7,369,340 B1 | 5/2008 | Dang et al. | |
| 7,423,830 B2 | 9/2008 | Ma et al. | |
| 7,426,090 B2 | 9/2008 | Yamashita et al. | |
| 7,477,465 B2 | 1/2009 | Yu | |
| 7,633,696 B2 * | 12/2009 | Kassab ........................... 360/31 |
| 7,729,080 B2 | 6/2010 | Suzuki | |
| 7,760,462 B2 | 7/2010 | Shibasaki | |
| 7,920,346 B2 * | 4/2011 | Tse et al. ......................... 360/31 |
| 8,320,069 B1 * | 11/2012 | Knigge et al. .................. 360/75 |
| 2002/0062470 A1 | 5/2002 | Yang et al. | |
| 2002/0063559 A1 | 5/2002 | Richter | |
| 2002/0118483 A1 * | 8/2002 | Meyer et al. ..................... 360/75 |
| 2003/0016461 A1 | 1/2003 | Seng et al. | |
| 2003/0043491 A1 | 3/2003 | Riddering et al. | |
| 2003/0067697 A1 | 4/2003 | Weinstein et al. | |
| 2003/0132747 A1 | 7/2003 | Hong et al. | |
| 2005/0185312 A1 * | 8/2005 | Ueda et al. ....................... 360/31 |
| 2006/0158769 A1 * | 7/2006 | Ono et al. ....................... 360/75 |
| 2007/0002486 A1 * | 1/2007 | Ahn et al. ....................... 360/75 |

(Continued)

*Primary Examiner* — Thomas Alunkal

(57) ABSTRACT

A disk drive is disclosed comprising a first head actuated over a first disk surface, and a second head actuated over a second disk surface. A first fly height (FH) setting is adjusted for the first head, and a second FH setting is adjusted for the second head. When a ratio of the first FH setting to the second FH setting exceeds a threshold, corrective action is taken.

22 Claims, 7 Drawing Sheets

(56) References Cited

U.S. PATENT DOCUMENTS

| | | |
|---|---|---|
| 2007/0268613 A1* | 11/2007 | Fitzpatrick et al. ............. 360/75 |
| 2007/0268615 A1 | 11/2007 | McFadyen et al. |
| 2008/0030888 A1* | 2/2008 | Brunnett et al. ................ 360/75 |
| 2008/0130159 A1 | 6/2008 | Dieron et al. |
| 2008/0165443 A1 | 7/2008 | Moline |
| 2008/0165446 A1 | 7/2008 | Partee |
| 2008/0174902 A1* | 7/2008 | Kim et al. ....................... 360/75 |
| 2009/0122437 A1* | 5/2009 | Gong et al. ..................... 360/75 |
| 2009/0141391 A1 | 6/2009 | Kuramoto et al. |
| 2009/0195902 A1 | 8/2009 | Moser et al. |
| 2009/0196129 A1 | 8/2009 | Suzuki et al. |
| 2009/0237830 A1 | 9/2009 | Shibasaki |
| 2009/0251828 A1* | 10/2009 | Schreck et al. ............... 360/319 |
| 2009/0310247 A1 | 12/2009 | Suzuki |

* cited by examiner

U.S. 8,730,612 B1

DISK DRIVE EVALUATING RATIO OF FLY HEIGHT SETTING FOR FIRST AND SECOND HEADS TO VERIFY OPERABILITY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of servo tracks 4 defined by servo sectors $6_0$-$6_N$ recorded around the circumference of each servo track, wherein data tracks are defined relative to the servo tracks. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height. For example, the DFH servo controller may measure the fly height of the head by reading a reference pattern from the disk and calculating a ratio of the read signal amplitude at first and second harmonics. Alternatively, a suitable fly height sensor integrated with the head may be employed to measure the fly height, such as a suitable capacitive sensor or a suitable tunneling sensor.

DETAILED DESCRIPTION OF EMBODIMENTS OF THE INVENTION

Figure 1:
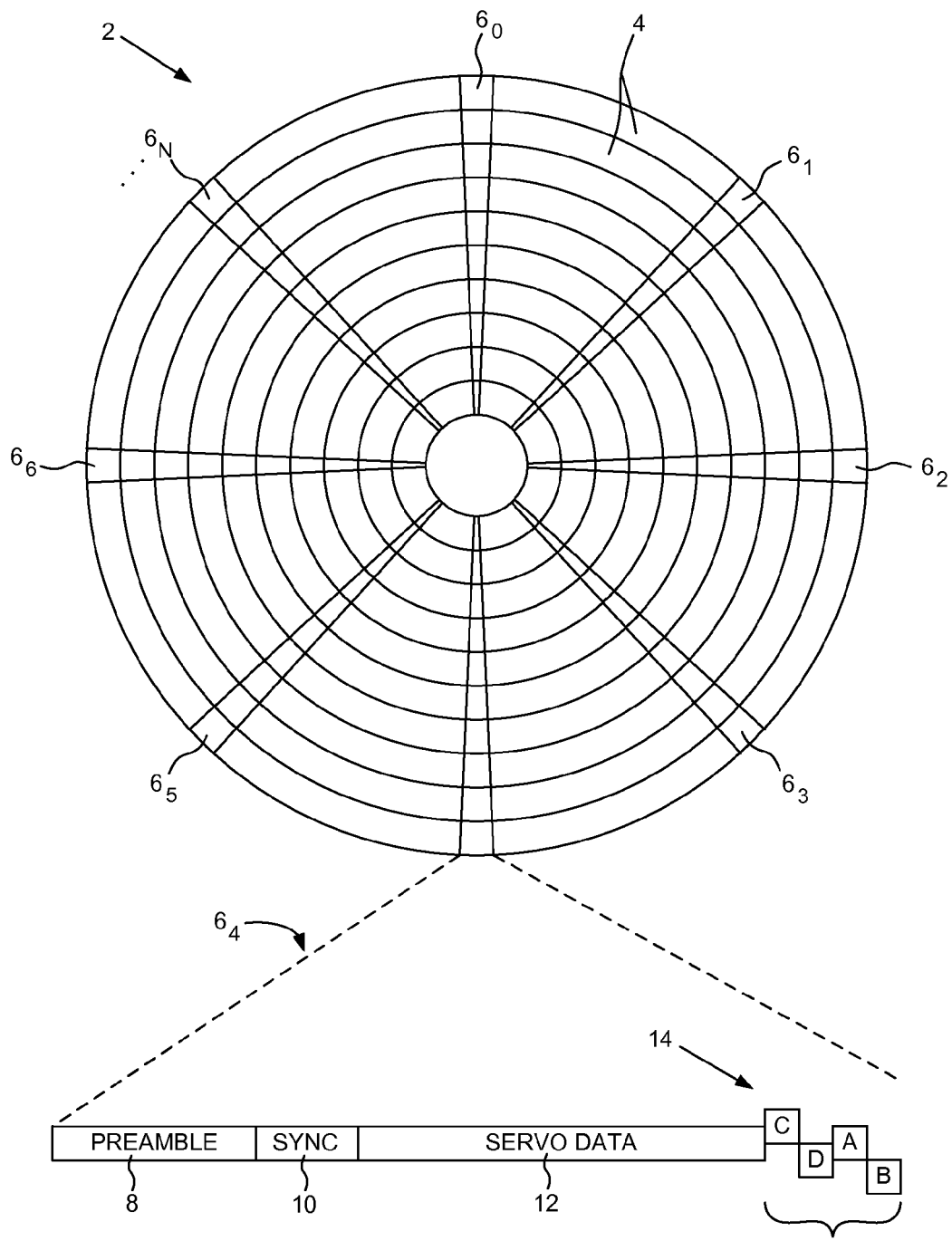
FIG. 1 shows a prior art disk format comprising a plurality of servo tracks defined by servo sectors.
Figure 2A:
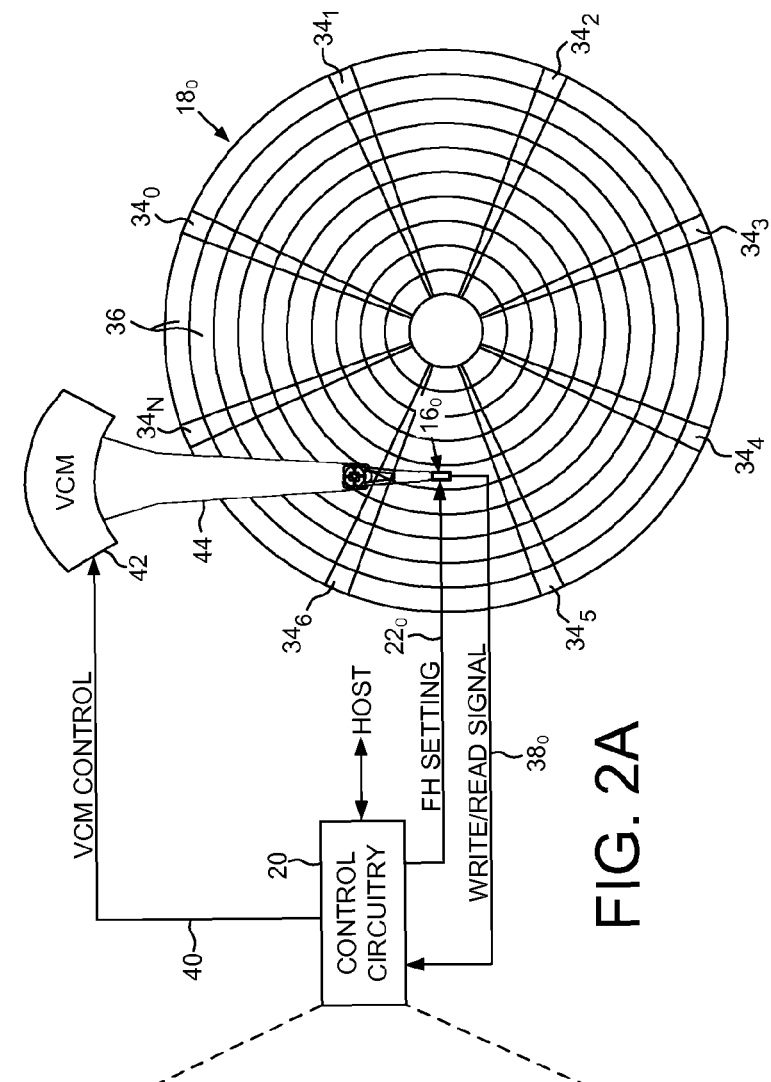
FIGS. 2A and 2B show a disk drive according to an embodiment of the present invention comprising a plurality of disk surfaces, and a head actuated over each disk surface.
Figure 2B:
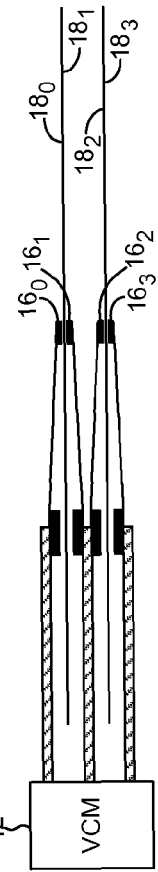

FIGS. 2A and 2B show a disk drive according to an embodiment of the present invention comprising a first head $16_0$ actuated over a first disk surface $18_0$, and a second head $16_1$ actuated over a second disk surface $18_1$. The disk drive further comprises control circuitry 20 operable to execute the flow diagram of FIG. 2C, wherein a first FH setting $22_0$ is adjusted for the first head $16_0$ (step 24), a second FH setting $22_1$ is adjusted for the second head $16_1$ (step 26), and when a ratio of the first FH setting to the second FH setting (step 28) exceeds a threshold (step 30), corrective action is taken (step 32).

In the embodiment of FIGS. 2A and 2B, each disk surface comprises servo sectors $34_0$-$34_N$ that define a plurality of servo tracks 36. The control circuitry 20 processes a read signal 38 emanating form the active head 16 to demodulate the servo sectors $34_0$-$34_N$ into a position error signal (PES). The PES is filtered with a suitable compensation filter to generate a control signal 40 applied to a voice coil motor (VCM) 42 which rotates an actuator arm 44 about a pivot in order to move the head 16 radially over the disk 18 in a direction that reduces the PES. The servo sectors $34_0$-$34_N$ may comprise any suitable position information, such as a track address for coarse positioning and servo bursts for fine positioning.

In one embodiment, each head $16_0$-$16_N$ in the disk drive comprises a suitable fly height actuator, such as a suitable heater or piezoelectric actuator. The control circuitry 20 adjusts the FH setting for each fly height actuator in order to maintain a target fly height for each head. Due to the slight difference in the geometry of the heads, as well as the different operating characteristic of each fly height actuator, the optimal FH setting may be different for each head so that each head achieves the target fly height. In addition, the fly height of each head may change due to environmental conditions (e.g., temperature, pressure, altitude, etc.), and therefore the control circuitry will typically recalibrate the FH settings for the head to account for changes in environmental conditions. In one embodiment, the control circuitry may execute the fly height calibration procedure when a change in an environmental condition is detected, and in another embodiment, the control circuitry may periodically execute the fly height calibration procedure at a frequency that accounts for changes in environmental conditions.

Any suitable fly height calibration procedure may be executed to determine the optimal FH setting for each head. In one embodiment, the control circuitry is operable to measure a fly height of each head, and adjust the FH setting for the head until the measured fly height substantially equals the target fly height. Any suitable technique may be employed to measure the fly height of each head. For example, in one embodiment each head may comprise a suitable fly height sensor, such as a suitable tunneling sensor, capable of sensing the fly height of the head relative to the disk surface. In another embodiment, the fly height of the head may be measured using a harmonic ratio technique, wherein a test pattern is read from the disk and a ratio of suitable harmonics in the read signal is evaluated to measure the fly height. In yet another embodiment, a Wallace spacing equation may be used to measure the fly height based on the amplitude of the read signal while reading a test pattern from the disk.

A problem can arise when calibrating the fly height of a head if, for example, the fly height sensor integrated into the head begins to fail, or if the test pattern written on the disk begins to degrade or is corrupted by adjacent track writes. To ensure the fly height calibration procedure makes an appropriate adjustment, the change to the FH setting may be verified. For example, a margin may be added to the adjusted FH setting to determine if the margined FH setting causes the head to touchdown onto the disk. If a touchdown is detected, the adjusted FH setting fails the verification. Alternatively, or in addition to the touchdown test, the control circuitry may measure a quality metric associated with reading data from the disk (e.g., a test pattern) using the adjusted FH setting. Any suitable quality metric may be measured, such as a bit error rate, or a read channel parameter, such as a gain error, timing error, mean squared error of the read samples, sequence detector quality metric, etc. If the quality metric indicates poor operating performance, the adjusted FH setting fails the verification.

The steps executed to verify the adjusted FH setting each time the fly height calibration procedure is executed may require a significant amount of time. For example, it may require multiple disk revolutions to perform the touchdown test and/or to measure the quality metrics associated with reading the test pattern from the disk. The embodiments of the present invention overcome this problem by adjusting the FH settings for first and second heads, and then comparing a ratio of the first and second FH settings to a threshold. If the ratio does not exceed the threshold, it is assumed the adjusted FH setting for each head is acceptable (i.e., it is assumed the fly height measurements for both heads is accurate). However, if the ratio exceeds the threshold, it is assumed that at least one of the FH settings is unacceptable due to an inaccurate fly height measurement (e.g., due to a degrading fly height sensor or a degrading test pattern), and a suitable corrective action is taken. For example, in one embodiment the test pattern used to calibrate the FH setting may be rewritten to the disk to thereby refresh the test pattern, or a fly height sensor may be recalibrated. In another embodiment described below, the fly height measurement for a particular head may be disabled when a fly height sensor fails altogether.

Figure 3:
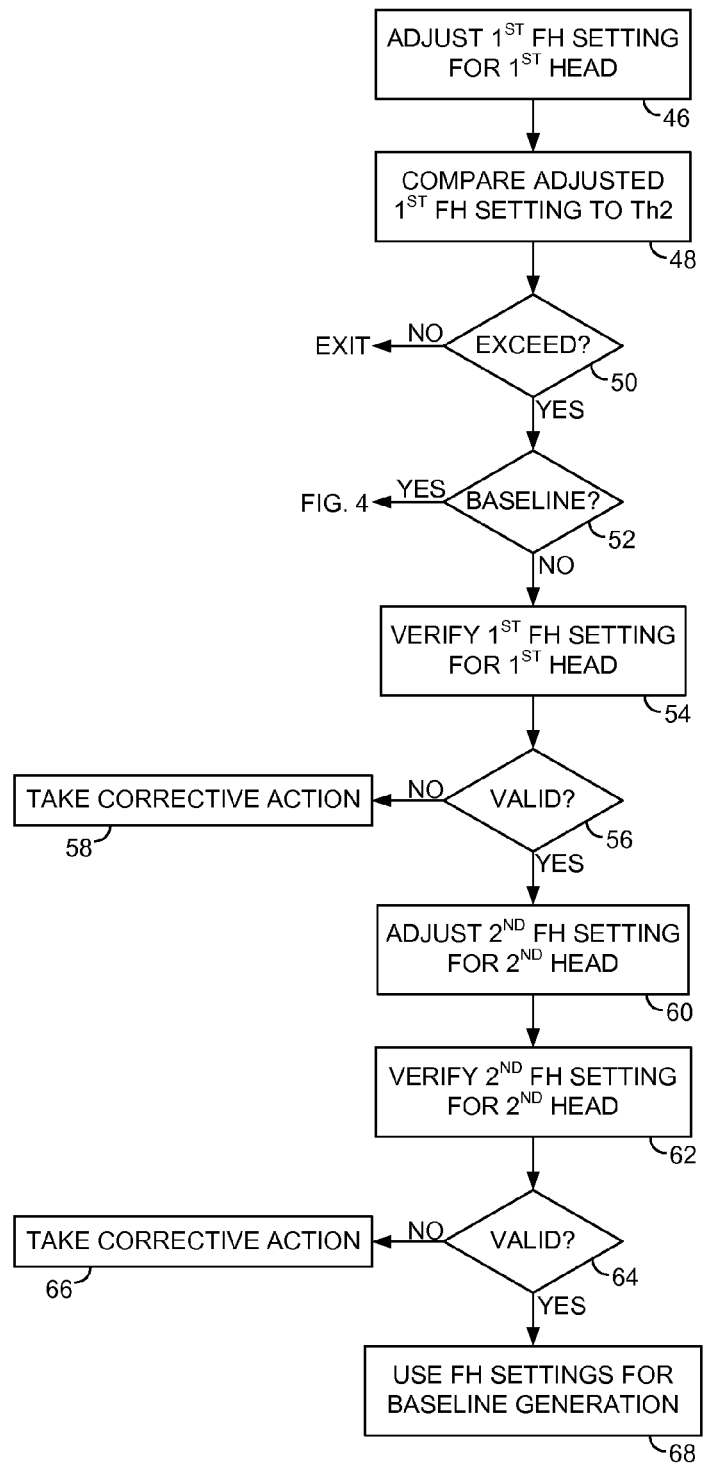
FIG. 3 is a flow diagram according to an embodiment of the present invention wherein a baseline ratio is generated based on the first and second FH settings after verifying the FH settings.
Figure 4:
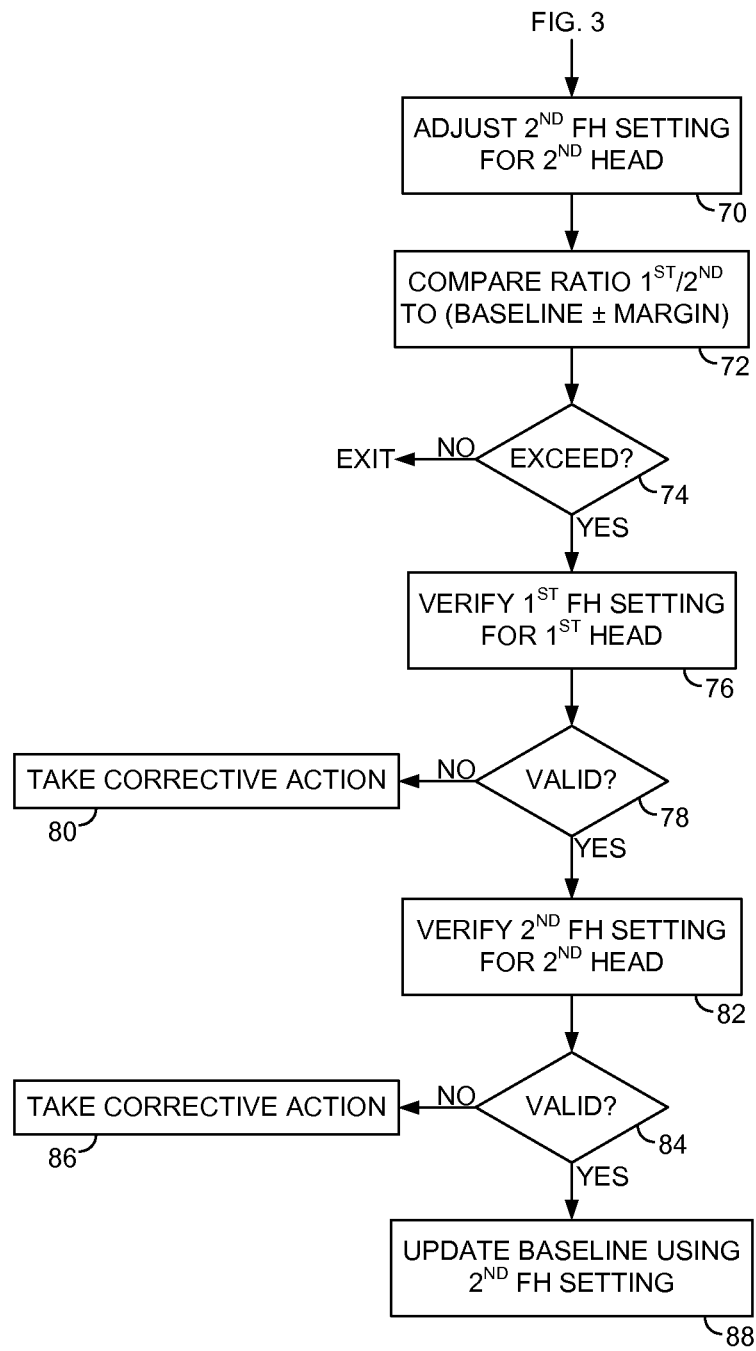
FIG. 4 is a flow diagram wherein the ratio of first and second FH settings is compared to a baseline ratio plus/minus a margin according to an embodiment of the present invention.

FIG. 3 is a flow diagram according to an embodiment of the present invention wherein when the fly height of the heads needs adjusting due, for example, to a change in an environmental condition, a first FH setting for a first head is adjusted (step 46). The first FH setting is compared to a threshold (step 48), and when it exceeds a threshold (step 50), the control circuitry determines whether a baseline ratio has been established (step 52). If a baseline ratio has been established, the flow diagram of FIG. 4 is executed. If a baseline ratio has not been established, the first FH setting for the first head is verified (step 54). If the first FH setting fails the verification (step 56), corrective action is taken (step 58). If the first FH setting is verified (step 56), a second FH setting for a second head is adjusted (step 60) and verified (step 62). If the second FH setting fails the verification (step 64), corrective action is taken (step 66). If the second FH setting is verified (step 64), the first and second FH settings are used to generate a baseline ratio (step 68).

Figure 2C:
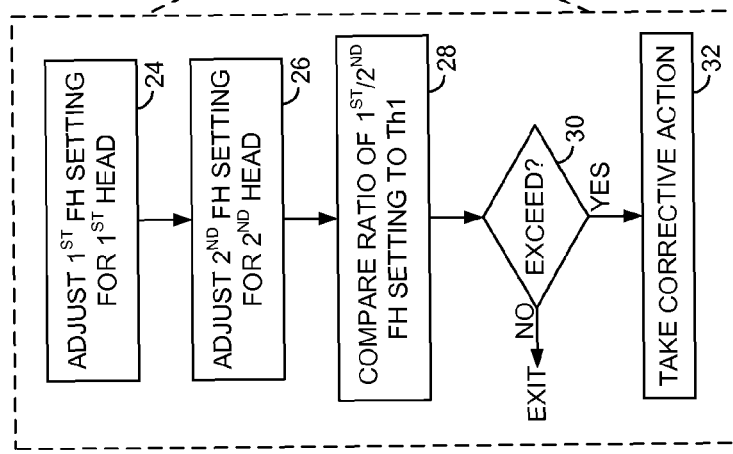
FIG. 2C is a flow diagram according to an embodiment of the present invention wherein corrective action is taken when a ratio of a first fly height (FH) setting for a first head to a second FH setting for a second head exceeds a threshold.

After establishing a baseline ratio, the flow diagram of FIG. 4 is executed such that when the first FH setting exceeds a threshold, and after adjusting the second FH setting (step 70), the ratio of the first FH setting to the second FH setting is compared to the baseline ratio plus/minus a margin (step 72). That is, the threshold at step 28 of FIG. 2C is configured to be the baseline ratio established using the verified FH settings plus/minus a margin that allows for a certain degree of deviation from a nominal (baseline) ratio. When the ratio exceeds the threshold (step 74), in the embodiment of FIG. 4 the first FH setting is verified (step 76). If the first FH setting fails the verification (step 78), corrective action is taken (step 80), otherwise the second FH setting is verified (step 82). If the second FH setting fails the verification (step 84), corrective action is taken (step 86), otherwise the baseline ratio is updated using the verified first and second FH settings (step 88). Accordingly in this embodiment if the valid FH settings shift over time, the baseline ratio is updated to reflect the change to the nominal ratio. In one embodiment a suitable filter is used to filter the updated ratios generated using newly verified FH settings so that the baseline ratio is updated slowly over time (i.e., by filtering outlier ratios).

Figure 5:
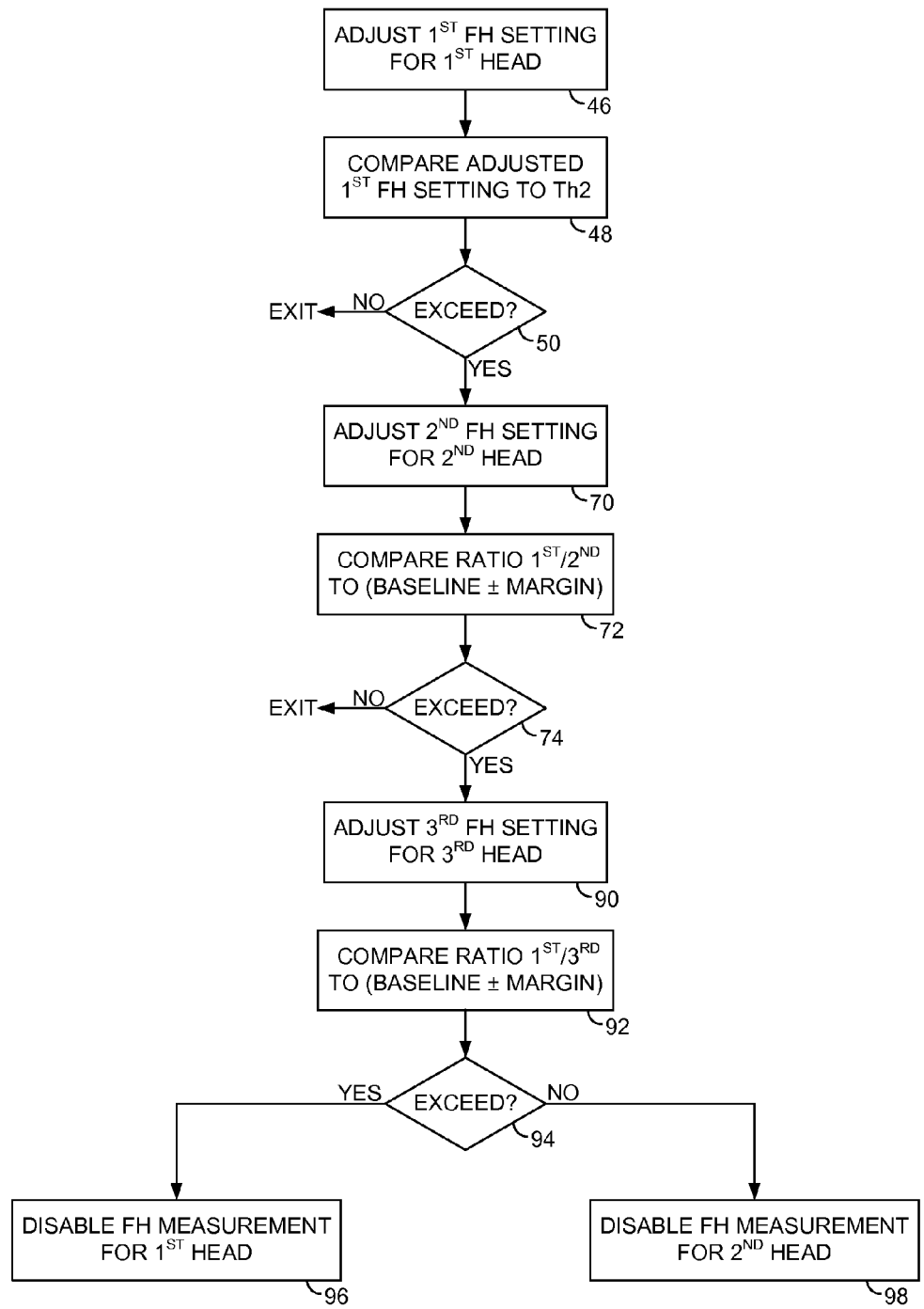
FIG. 5 is a flow diagram wherein the corrective action comprises evaluating a ratio of the first FH setting to a third FH setting for a third head to detect a defect with respect to one of the first and second heads according to an embodiment of the present invention.

FIG. 5 shows a flow diagram according to an embodiment of the present invention wherein when the ratio of the first to second FH settings exceeds the baseline ratio plus/minus a margin (step 74), a third FH setting for a third head is adjusted (step 90). A ratio of the first FH setting to the third FH setting is compared to a baseline ratio previously established for the first and third heads (step 92). When the ratio exceeds the baseline ratio plus/minus a margin (step 94), it is assumed there is a problem with the fly height measurement for the first head and corrective action is taken for the first head (step 96). If the ratio does not exceed the baseline ratio plus/minus the margin (step 94), it is assumed there is a problem with the fly height measurement for the second head and corrective action is taken for the second head (step 98). In this embodiment, the corrective action may include verifying the FH setting for the suspect head prior to taking further corrective action, such as disabling the fly height measurement for the head. This embodiment may improve performance by identifying the suspect head faster rather than verify the FH setting for both the first and second heads as in the embodiment of FIG. 4.

Figure 6:
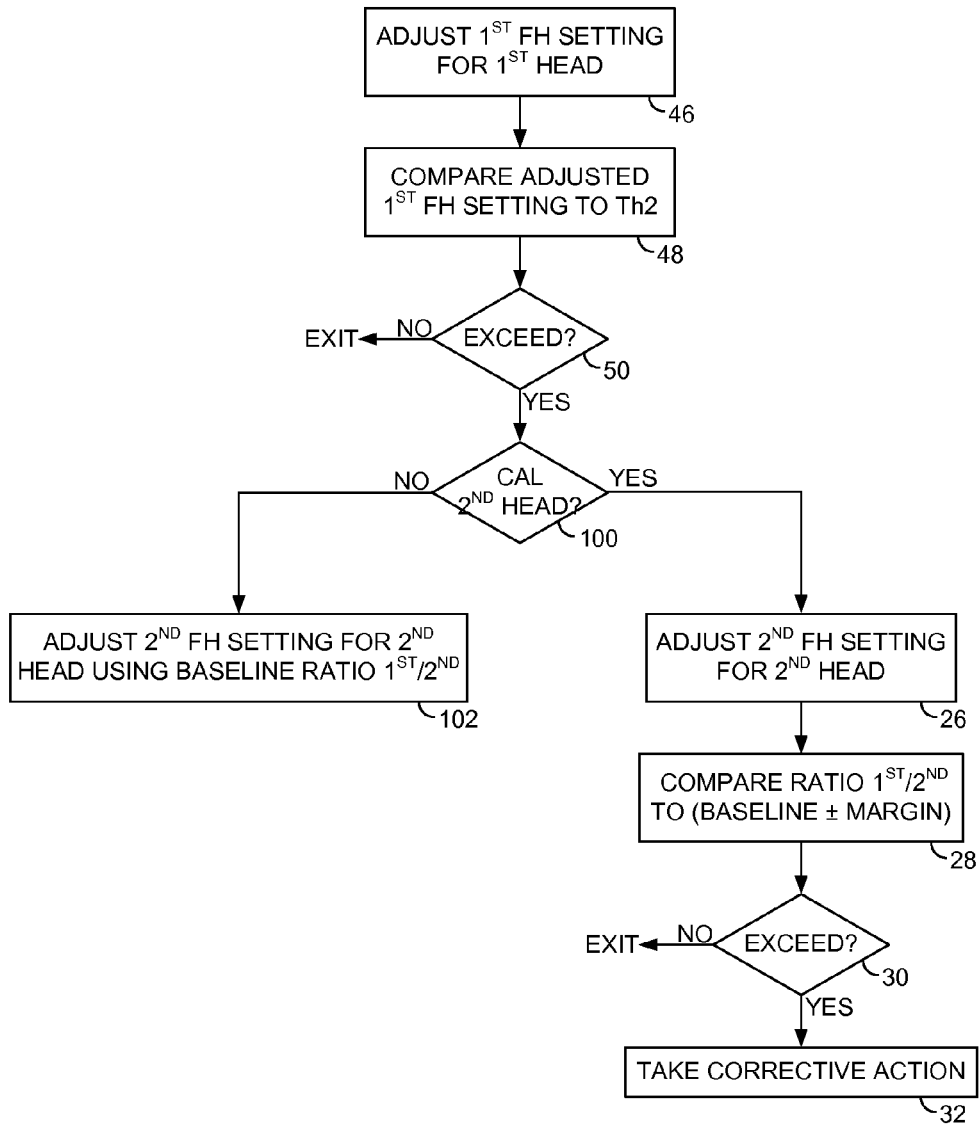
FIG. 6 is a flow diagram according to an embodiment wherein when measuring the fly height for the second head is disabled, the FH setting for the second head is adjusted based on the FH setting for the first head and the baseline ratio.

FIG. 6 is a flow diagram according to an embodiment of the present invention wherein when the first FH setting is adjusted (step 46) and the adjusted FH setting exceeds the threshold (step 50), the control circuitry determines whether the fly height calibration measurement for the second head has been disabled (step 100). If the fly height calibration measurement has been disabled, then the second FH setting for the second head is adjusted based on the first FH setting and the baseline ratio previously established for the first and second heads (step 102). For example, the second FH setting may be adjusted by dividing the first FH setting by the previously established baseline ratio. In this embodiment, when the fly height measurement has been disabled for a head due, for example, to a defective fly height sensor, the FH setting for the head can still be adjusted based on the FH setting of a different head and the corresponding baseline ratio previously established between the disabled head and the different head.

Figure 7:
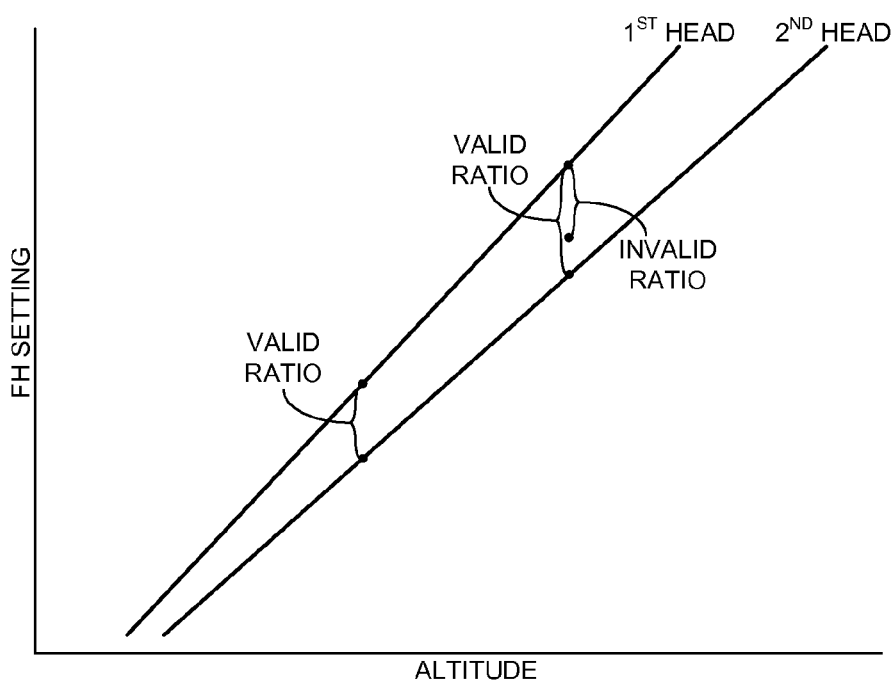
FIG. 7 illustrates FH settings for first and second heads relative to an altitude of the disk drive, wherein an invalid ratio between the settings indicates the need for corrective action according to an embodiment of the present invention.

FIG. 7 is a graph illustrating an embodiment of the present invention wherein the FH setting for first and second heads changes (in this example linearly) relative to an environmental condition (in this example altitude). The FH settings may differ between the heads as shown in FIG. 7 due, for example, to a difference in head geometry affecting their aeronautics, or due to the different response of the fly height actuator integrated with each head. When the disk drive is operating normally, the valid FH settings generated for each head over the different environmental conditions are used to establish a nominal (baseline) ratio of FH settings between the heads. If after establishing the baseline ratio for the heads an invalid ratio is detected, it indicates a potential problem with one or both of the FH settings and corrective action is taken as described above.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a first head comprising a first fly height actuator operable to control a fly height of the first head over a first disk surface;
   a second head comprising a second fly height actuator operable to control a fly height of the second head over a second disk surface; and
   control circuitry operable to:
      adjust a first fly height (FH) setting for controlling the first fly height actuator;
      adjust a second FH setting for controlling the second fly height actuator; and
      when a ratio of the first FH setting to the second FH setting exceeds a first threshold, take corrective action.

2. The disk drive as recited in claim 1, wherein the control circuitry is further operable to:
   measure a fly height of the first head; and
   adjust the first FH setting in response to the measured fly height.

3. The disk drive as recited in claim 2, wherein the control circuitry is further operable to measure the fly height of the first head after detecting a change in an environmental condition.

4. The disk drive as recited in claim 1, wherein the control circuitry is further operable to adjust the second FH setting when the first FH setting exceeds a second threshold.

5. The disk drive as recited in claim 1, wherein the control circuitry is further operable to generate a baseline ratio in response to the first and second FH settings.

6. The disk drive as recited in claim 5, wherein the control circuitry is further operable to configure the first threshold relative to the baseline ratio.

7. The disk drive as recited in claim 5, wherein the control circuitry is further operable to take the corrective action by:
   verifying the first and second FH settings to generate verified settings; and
   updating the baseline ratio in response the verified settings.

8. The disk drive as recited in claim 1, wherein the control circuitry is further operable to:
   verify the first and second FH settings to generate verified settings; and
   generate a baseline ratio in response the verified settings.

9. The disk drive as recited in claim 1, wherein the control circuitry is further operable to take the corrective action by:
   adjusting a third FH setting for a third head; and
   when a ratio of the first FH setting to the third FH setting does not exceed a third threshold, taking the corrective action relative to the second head.

10. The disk drive as recited in claim 2, wherein the control circuitry is further operable to take the corrective action by disabling the measuring of the fly height of the second head.

11. The disk drive as recited in claim 10, wherein the control circuitry is further operable to:
    generate a baseline ratio in response the first and second FH settings; and
    when the measuring of the fly height of the second head is disabled, adjust the second FH setting based on the first FH setting and the baseline ratio.

12. A method of operating a disk drive, the disk drive comprising a first head comprising a first fly height actuator operable to control a fly height of the first head over a first disk surface, and a second head comprising a second fly height actuator operable to control a fly height of the second head over a second disk surface, the method comprising:
    adjusting a first fly height (FH) setting for controlling the first head fly height actuator;
    adjusting a second FH setting for controlling the second head fly height actuator; and
    when a ratio of the first FH setting to the second FH setting exceeds a first threshold, taking corrective action.

13. The method as recited in claim 12, further comprising:
    measuring a fly height of the first head; and
    adjusting the first FH setting in response to the measured fly height.

14. The method as recited in claim 13, further comprising measuring the fly height of the first head after detecting a change in an environmental condition.

15. The method as recited in claim 12, further comprising adjusting the second FH setting when the first FH setting exceeds a second threshold.

16. The method as recited in claim 12, further comprising generating a baseline ratio in response to the first and second FH settings.

17. The method as recited in claim 16, further comprising configure the first threshold relative to the baseline ratio.

18. The method as recited in claim 16, further comprising taking the corrective action by:
   verifying the first and second FH settings to generate verified settings; and
   updating the baseline ratio in response the verified settings.

19. The method as recited in claim 12, further comprising:
   verifying the first and second FH settings to generate verified settings; and
   generating a baseline ratio in response the verified settings.

20. The method as recited in claim 12, further comprising taking the corrective action by:
   adjusting a third FH setting for a third head; and
   when a ratio of the first FH setting to the third FH setting does not exceed a third threshold, taking the corrective action relative to the second head.

21. The method as recited in claim 13, further comprising taking the corrective action by disabling the measuring of the fly height of the second head.

22. The method as recited in claim 21, further comprising:
   generating a baseline ratio in response the first and second FH settings; and
   when the measuring of the fly height of the second head is disabled, adjusting the second FH setting based on the first FH setting and the baseline ratio.

* * * * *